US 6,578,869 B2

(12) United States Patent
Zayan et al.

(10) Patent No.: US 6,578,869 B2
(45) Date of Patent: Jun. 17, 2003

(54) VEHICLE OCCUPANT POSITION SENSOR UTILIZING IMAGE FOCUS ATTRIBUTES

(75) Inventors: Nicholas M. Zayan, Fenton, MI (US); Stephen R. W. Cooper, Fowlerville, MI (US); Jon K. Wallace, Redford, MI (US); Farid Khairallah, Farmington Hills, MI (US)

(73) Assignee: TRW Inc., Lyndhurst, OH (US)

( * ) Notice: Subject to any disclaimer, the term of this patent is extended or adjusted under 35 U.S.C. 154(b) by 79 days.

(21) Appl. No.: 09/817,520

(22) Filed: Mar. 26, 2001

(65) Prior Publication Data
US 2002/0135165 A1 Sep. 26, 2002

(51) Int. Cl.$^7$ .............................................. B60R 21/32
(52) U.S. Cl. ........................................ 280/735; 701/45
(58) Field of Search ......................... 701/45; 280/735; 250/221, 559.38

(56) References Cited

U.S. PATENT DOCUMENTS

| 5,371,542 A | * | 12/1994 | Pauli et al. ................ 348/25 |
| 5,834,765 A | | 11/1998 | Ashdown ................... 250/221 |
| 5,848,802 A | | 12/1998 | Breed et al. ................ 280/735 |
| 5,901,236 A | | 5/1999 | Mizui ........................ 382/104 |
| 5,903,680 A | * | 5/1999 | De Haan et al. ............ 348/607 |
| 5,993,015 A | | 11/1999 | Fredricks ................... 359/843 |
| 6,005,485 A | * | 12/1999 | Kursawe et al. ........... 180/271 |
| 6,115,128 A | * | 9/2000 | Vann ...................... 250/559.38 |
| 6,116,639 A | | 9/2000 | Breed et al. ................ 280/735 |
| 6,198,998 B1 | * | 3/2001 | Farmer et al. ............. 340/438 |
| 6,236,035 B1 | * | 5/2001 | Saar et al. .................. 250/221 |
| 6,252,240 B1 | * | 6/2001 | Gillis et al. ................. 250/221 |
| 6,310,982 B1 | * | 10/2001 | Allred et al. ............... 382/236 |
| 6,335,990 B1 | * | 1/2002 | Chen et al. ................. 348/607 |

* cited by examiner

Primary Examiner—Lesley D. Morris
Assistant Examiner—L. Lum
(74) Attorney, Agent, or Firm—Tarolli, Sundheim, Covell & Tummino L.L.P.

(57) ABSTRACT

A vehicle occupant sensor apparatus (34) has an imager (36) that gathers an image of an occupant (12). The image has focus attributes. A focal plane associated with the imager (36) is at a distance from the imager. A 2D high-pass filter (42), a multiple frame temporal filter (46), and a position determination component (52) operate to determine position of the occupant (12) relative to the focal plane (38) via use of the focus attributes.

17 Claims, 2 Drawing Sheets

| SIZE (TEMPORAL) | 2D HPF OUTPUT (SPATIAL) | OBJECT (E.G., OCCUPANT) MOVEMENT | OBJECT POSITION |
|---|---|---|---|
| INCREASING | DECREASING | INWARD | FORWARD OF FOCAL PLANE |
| INCREASING | INCREASING | INWARD | BEHIND FOCAL PLANE |
| DECREASING | INCREASING | OUTWARD | FORWARD OF FOCAL PLANE |
| DECREASING | DECREASING | OUTWARD | BEHIND FOCAL PLANE |

Fig.2

VEHICLE OCCUPANT POSITION SENSOR UTILIZING IMAGE FOCUS ATTRIBUTES

TECHNICAL FIELD

The present invention relates to vehicle occupant protection systems, and is directed to an apparatus for sensing a vehicle occupant to provide information useful for control within an occupant protection system.

BACKGROUND OF THE INVENTION

Vehicle occupant protection systems that have an actuatable protection device are known in the art. The actuatable protection device of such a system is actuated upon the occurrence of a condition for which a vehicle occupant is to be protected. An example of a condition for which a vehicle occupant is to be protected is a vehicle crash.

One type of actuatable protection system includes an air bag module mounted within a vehicle such that an air bag of the module is inflatable within an occupant compartment of the vehicle. The air bag is inflated upon the occurrence of a condition, such as a vehicle crash. Another type of actuatable protection system has a seat belt extendable across a vehicle occupant and includes an actuatable device, such as a pretensioner, to move at least a portion of the seat belt relative to the occupant. The pretensioner removes slack from the seat belt to limit occupant movement, and is actuated upon the occurrence of a condition such as a vehicle crash.

An actuatable occupant protection system includes one or more sensors for sensing one or more parameters that are indicative of a condition for which the vehicle occupant is to be protected. For example, one sensor is a crash sensor that provides a signal indicative of a vehicle crash condition. The one or more sensors provide signals to a controller. The controller evaluates the signal(s) and determines whether to actuate the associated protection device.

One type of actuatable protection system has one or more adjustable aspects that are adjusted to change the actuation (i.e., deployment) of the protection device. For example, in a system that includes an air bag, the deployment profile of the air bag is adjustable. The adjustable aspects regarding the deployment profile of the air bag may include adjustment of a timing sequence for inflation, adjustment of pressure within the air bag during inflation and upon completion of inflation, and adjustment of air bag position with respect to the occupant.

To make determinations regarding adjustment, one or more characteristics of an occupant are sensed or are derived from occupant sensory information. Examples of occupant characteristics include: size of the occupant, weight of the occupant, position of the occupant, and distance between the occupant and a vehicle component surface (e.g., an air bag module).

Turning attention, for the moment, to the issue of distance determination, distance determination is typically accomplished by some form of ranging sensor. Ranging sensors can have various configurations. One type of ranging sensor is an ultrasonic ranging sensor. Another type of ranging sensor is an infrared ranging sensor.

Although many sensor systems are known, there are continuing needs for improvements and efficiencies in techniques and costs.

SUMMARY OF THE INVENTION

In accordance with one aspect, the present invention provides a vehicle occupant sensor apparatus that includes means for gathering an image of an occupant. The image has focus attributes. A focal plane associated with the means for gathering is at a distance from the means for gathering. The apparatus also includes means for determining position of the occupant relative to the focal plane utilizing the focus attributes.

In accordance with another aspect, the present invention provides a vehicle occupant sensor apparatus that includes an imager that collects an image of an occupant and that outputs a signal indicative of the collected image. The image has focus attributes. A focal plane associated with the imager is at a distance from the imager. A two-dimensional high-pass filter is operatively connected to the imager to provide a signal indicative of high frequency content of the imager signal. A multiple frame temporal filter is operatively connected to the imager to provide a signal indicative of image size conveyed by the imager signal. A position determination component is operatively connected to the two-dimensional high pass filter and the multiple frame temporal filter to determine position of the occupant relative to the focal plane utilizing the signal indicative of high frequency content of the imager signal the signal indicative of image size conveyed by the imager signal.

In accordance with another aspect, the present invention provides a method of sensing a vehicle occupant. An image of an occupant is gathered. The image has focus attributes. A focal plane is at a distance from a location of image gathering. Position of the occupant relative to the focal plane is determined utilizing the focus attributes.

BRIEF DESCRIPTION OF THE DRAWINGS

The foregoing and other features and advantages of the present invention will become apparent to those skilled in the art to which the present invention relates upon reading the following description with reference to the accompanying drawings, in which:

FIG. 2 is a chart indicating sensory perception by the apparatus of FIG. 1 and associated determinations.

DESCRIPTION OF AN EXAMPLE EMBODIMENT

Figure 1:
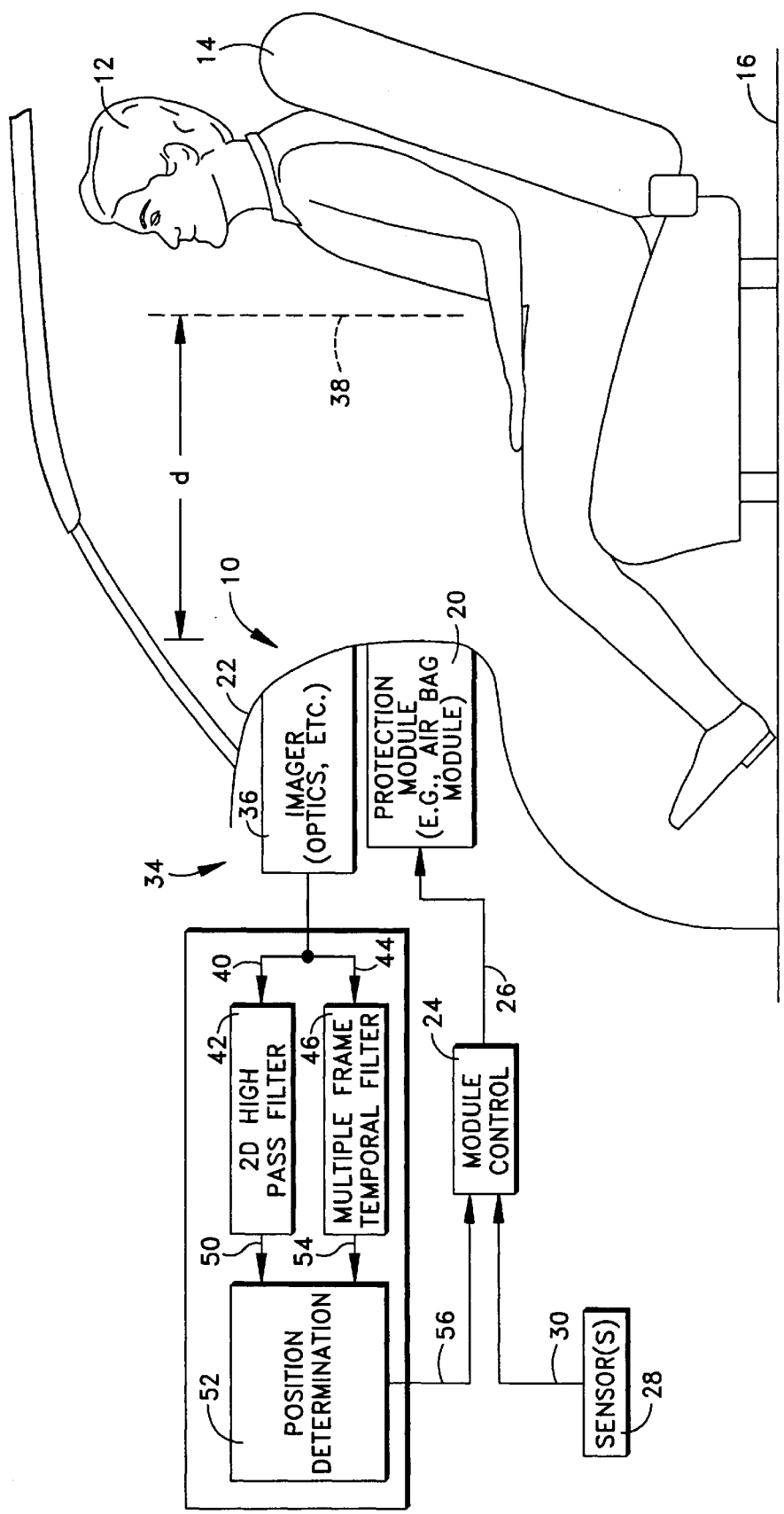
FIG. 1 is a schematic illustration of a portion of a vehicle that contains a vehicle occupant protection system with a vehicle occupant sensor apparatus in accordance with the present invention.

An occupant protection system 10 is schematically illustrated in FIG. 1. The system 10 is provided for an occupant 12 seated on a vehicle seat 14 within a vehicle 16. The system 10 includes an actuatable occupant protection device 20 that is provided as a module.

The protection module 20 is associated with the vehicle seat 14 and thus an occupant seating location provided at the seat. In one example embodiment, the protection module 20 includes an inflatable component, commonly referred to as an air bag. The air bag is inflatable within an occupant compartment of the vehicle 16. In the illustrated example, the protection module 20 is located within a dashboard or instrument panel 22 of the vehicle 16 and the vehicle seat 14 is a front passenger seat.

It is to be appreciated that the specific type and the location of the protection device are not limitations on the present invention. In other words, features of the protection device may be changed without departing from the present invention. For example, another type of protection device (e.g., a driver's side protection module or a side curtain module) may be provided in the system 10 and/or the protection device may be located elsewhere within the vehicle (e.g., on the steering wheel). The system 10 may include a protection device that does not have an inflatable component, such as an actuatable knee bolster or a seat belt system with an actuatable portion (e.g., a pretensioner). Also, it is to be appreciated that the system 10 may include a plurality of actuatable protection devices.

In one example embodiment, the protection module 20 may also have at least one adjustable aspect. For example, the deployment of the air bag is adjusted. Examples of air bag deployment adjustment include adjustment of inflation timing, adjustment of inflation pressure, adjustment of location of the inflated air bag relative to the occupant, and adjustment of the dynamic profile of the air bag during inflation. A specific example of adjustment to inflation timing is selection of a time period between a determination to actuate the protection module and an initiation of the air bag inflation. A specific example of adjustment of inflation pressure is control of a pressure release valve that vents the air bag. An example of dynamic profile control is accomplished by directing inflation fluid into the air bag in predetermined zones within the air bag.

A specific example of adjustment of air bag positioning is control of positioning motors operative to move an air bag housing. Another specific example of adjustment of air bag positioning is moving the entire protection module toward or away from the occupant and/or moving the occupant toward or away from the protection module.

Control of the protection module 20, to adjust any adjustable aspect(s) and to cause actuation of the protection module is by a controller 24 that is operatively connected 26 to provide control signals to the protection module. In one example, the controller 24 includes a microcomputer. The controller 24 receives sensory input from several sources and, using the sensory input, makes determinations regarding protection module control.

One of the sensory input sources for the controller 24 is a sensor 28 that senses a vehicle condition for which an occupant is to be protected, and that is operatively connected 30 to provide a signal to the controller indicative of the sensed vehicle condition. In one example, the sensor 28 is a crash sensor that senses a condition that is indicative of a vehicle crash. In a specific example, the crash sensor 28 is an accelerometer, and the signal provided therefrom is an electrical signal that has a voltage value indicative of the sensed acceleration and/or a frequency value indicative of the sensed acceleration. In another specific example, the sensor 28 senses a condition indicative of a vehicle rollover. It is to be appreciated that the system 10 could have a plurality of sensors providing signals to the controller 24 that are indicative of vehicle conditions for which the occupant is to be protected. Hereinafter, only the single crash sensor 28 and its crash indicative signal are discussed.

An occupant sensor apparatus 34, in accordance with the present invention, provides another sensory input for the controller 24. In the illustrated example, at least some portion of the sensor apparatus 34 is mounted in the instrument panel 22 near the protection module 20. However, it will be appreciated upon further reading that other locations for the sensor apparatus 34 are possible.

The sensor apparatus 34 includes an imager 36 that is operative to gather an image of the occupant location at the vehicle seat 14. Specifically, the imager 36 gathers an image of the occupant 12, if the occupant is present, or, in the absence of the occupant, an image of the vehicle seat 14 and/or an occupying object. As such, it is to be appreciated that the term occupant is to be broadly interpreted. Specifically, the occupant could be a person on the seat, a child located within a child seat on the vehicle seat 14, and inanimate object, etc.

The imager 36 may have any type of construction that provides the function of gathering a two-dimensional, digital image. Specifically, the imager 36 may include optics and an image reception device such as a charge coupled display, etc. The components of the imager 36 are selected/adjusted such that a focal plane 38 for the imager is provided at a known distance d from the imager, and thus a known distance from the instrument panel 22 that contains the protection module 20.

The focal plane 38 is the plane at which a surface located thereat provides for a gathered image with maximum focus qualities. For the surface at the focal plane 38, the gathered image will have a highest possible degree of sharpness, with small details having a high degree of contrast where pattern change occurs. Also, an in-focus image provides for a maximization of spatial high frequency image content. Accordingly, when the surface is at the focal plane, the gathered image has high frequency content that is at a maximum.

In distinction, when a surface that is to be imaged is away from the focal plane, the gathered image is not in focus. The image appears blurred. Attendant with the out-of-focus image, spatial high frequency content decreases from the obtainable maximum.

It is to be appreciated that the surface to be imaged is a surface of the occupant 12, if the occupant is present. Also, it is to be appreciated that the surface of the occupant 12 may be located at the focal plane 38, forward (e.g., toward the instrument panel 22) of the focal plane, or rearward of the focal plane. Further, movement of the occupant 12 is typically associated with movement of the imaged surface of the occupant 12 relative to the focal plane 38.

The imager 36 is operatively connected 40 to a two-dimensional (2D) high-pass filter 42 and is also operatively connected 44 to a multiple frame temporal filter 46. Accordingly, a signal indicative of the two-dimensional gathered image is provided to each of the 2D high-pass filter 42 and the multiple frame temporal filter 46.

The 2D high-pass filter 42 operates to pass only HIGH frequency content found within the gathered image signal. Thus, when the surface of the imaged object is located at the focal plane 38, a highest amount of HIGH frequency content within the image passes through the 2D high-pass filter 42. As the surface of the imaged object is located at a increased distance from the focal plane, the amount of HIGH frequency content passed through the 2D high-pass filter 42 correspondingly decreases. Accordingly, the 2D high-pass filter 42 operates to filter-out (e.g., prevent passage) of a greater amount of the signal. Thus, the output of the 2D high-pass filter 42 is indicative of proximity of the imaged surface to the focal plane 38.

The multiple frame temporal filter 46 operates to provide an indication of apparent changing size of the imaged object. Apparent size is dependent upon distance to object. In other words, objects that are closer have a bigger image and vice versa. As such, during movement of the occupant, the multiple frame temporal filter 46 operates to provide an indication, over time, of change in the apparent size of the image and thus an indication of occupant movement.

The 2D high-pass filter 42 is operatively connected 50 to an occupant position determination component 52.

Similarly, the multiple frame temporal filter 46 is operatively connected 54 to the position determination component 52. The position determination component 52 has any suitable structure for processing the provided indicative signals. For example, the position determination component 52 may include a microprocessor.

Based upon the provided information, the position determination component 52 determines the position of the imaged object (e.g., the occupant 12) relative to the focal plane 38 via the use of focus attributes. The chart of FIG. 2 indicates various scenarios of example focus attributes in which the image information is utilized to determine the position of the occupant 12 relative to the focal plane 38.

If the apparent size of the imaged object (e.g., the occupant 12) is increasing, the position determination component 52 determines that the object is moving toward the imager 36 (i.e., forward, as illustrated in FIG. 1). The multiple frame temporal filter 46 provides this indication of change of apparent size.

If the imaged surface of the occupant 12 is forward of the focal plane 38, the forward movement is away from the focal plane. If the imaged surface of the occupant 12 is located rearward the focal plane 38, the forward movement is toward the focal plane. However, the indication of movement provided by the multiple frame temporal filter 46, alone, is not indicative of the position of the imaged surface being forward or rearward of the focal plane 38.

Depending on whether the imaged surface of the occupant 12 is located forward or rearward of the focal plane 38, the forward movement has different effects on the spatial HIGH frequency content of the gathered image. Specifically, if the imaged surface of the occupant 12 is located forward of the focal plane 38, the spatial HIGH frequency content decreases as the occupant moves forward, away from the focal plane. In distinction, if the imaged surface of the occupant 12 is located behind the focal plane 38, the forward movement of the occupant is toward the focal plane. Thus, the spatial HIGH frequency content of the gathered image increases.

If the imaged surface of the occupant 12 is moving rearward, away from the instrument panel, the temporal size of the gathered image decreases. Thus, the multiple frame temporal filter 46 provides an indication to the rearward movement. If the imaged surface of the occupant 12 is located forward of the focal plane, the rearward movement of the occupant causes the spatial HIGH frequency content to increase. In distinction, if the imaged surface of the occupant 12 is located behind the focal plane, the rearward movement of the occupant causes a decrease in the spatial HIGH frequency content of the gathered image. The 2D high-pass filter 42 provides an indication of increasing or decreasing HIGH frequency content, respectively. The information permits a determination as to whether the occupant is located forward or behind the focal plane.

The position determination component 52 is operatively connected 56 to the controller 24. The controller 24 utilizes the position information in controlling the protection module 20.

It is to be appreciated that the rate at which the sensor apparatus 34 operates to make distance determinations may be chosen to provide any suitable rate of information for the controller 24. Still further, the determinations may be made before or during a crash condition that would cause movement of the occupant 12 such that appropriate control of the protection module 20 is effected.

At this point, it is to be appreciated that the imager may be mounted at a different location in the vehicle. Determined distance would be related to the focal plane for the imager at the different location. For example, if the protection device is a side curtain, locating the imager to the side of the occupant location would provide a focal plane that is at a known distance from the side location of the imager. Accordingly, distance indication from the side location of the imager is made with respect to the focal plane for the imager at the side location.

From the above description of the invention, those skilled in the art will perceive improvements, changes and modifications. Such improvements, changes and modifications within the skill of the art are intended to be covered by the appended claims.

Having described the invention, the following is claimed:

1. A vehicle occupant sensor apparatus comprising:
    an imager that collects an image of an occupant and that outputs a signal indicative of the collected image, the image having focus attributes, a focal plane associated with said imager being at a distance from said imager;
    a two-dimensional high pass filter operatively connected to the imager to provide a signal indicative of high frequency content of the imager signal;
    a multiple frame temporal filter operatively connected to the imager to provide a signal indicative of image size conveyed by the imager signal; and
    a position determination component operatively connected to said two-dimensional high pass filter and said multiple frame temporal filter to determine position of the occupant relative to the focal plane utilizing the signal indicative of high frequency content of the imager signal and the signal indicative of image size.

2. The vehicle occupant sensor apparatus of claim 1 wherein the high frequency content signal is indicative of a sharpness of the image, the sharpness of the image being a focus attribute that is functionally related to the position of the occupant relative to the focal plane.

3. The vehicle occupant sensor apparatus of claim 1 wherein the image size signal is a focus attribute that is functionally related to the position of the occupant relative to the focal plane.

4. A vehicle occupant sensor apparatus comprising:
    means for producing periodic images of an occupant, the periodic images having at least two focus attributes that are functionally related to a position of the occupant relative to a focal plane; and
    means for detecting changes in the at least two focus attributes of the periodic signals and, in response to the changes in the at least two focus attributes of the periodic signals, for determining the position of the occupant relative to the focal plane.

5. The vehicle occupant sensor apparatus of claim 4 wherein the means for producing has a location that is spaced from the focal plane by a fixed distance, the means for detecting changes also being responsive to the changes in the at least two focus attributes for determining the position of the occupant relative to the location.

6. The vehicle occupant sensor apparatus of claim 4 wherein the at least two focus attributes include sharpness of the periodic images and apparent size of the occupant in the periodic images.

7. The vehicle occupant sensor apparatus of claim 6 further including first and second filter means for receiving the periodic images from the means for producing periodic images, the first filter means outputting sharpness signals that are indicative of the sharpness of the received periodic images, the second filter means outputting size signals that are indicative of the apparent size of the occupant in the received periodic images.

8. The vehicle occupant sensor apparatus of claim 7 wherein the means for detecting changes receives the sharpness signals and the size signals and detects changes in the received sharpness and size signals for determining the position of the occupant relative to the focal plane.

9. The vehicle occupant sensor apparatus of claim 8 wherein the means for detecting changes determines that the occupant is positioned rearward of the focal plane relative to the means for producing periodic images when the detected changes of the sharpness and size signals indicate an increase in both the sharpness and apparent size of the occupant.

10. The vehicle occupant sensor apparatus of claim 8 wherein the means for detecting changes determines that the occupant is positioned rearward of the focal plane relative to the means for producing periodic images when the detected changes of the sharpness and size signals indicate a decrease in both the sharpness and apparent size of the occupant.

11. The vehicle occupant sensor apparatus of claim 8 wherein the means for detecting changes determines that the occupant is positioned forward of the focal plane relative to the means for producing periodic images when the detected changes of the sharpness and size signals indicate one of the sharpness and apparent size of the occupant increasing and another of the sharpness and apparent size of the occupant decreasing.

12. A method of sensing a vehicle occupant comprising the steps of:

producing periodic images of an occupant, the periodic images having at least two focus attributes that are functionally related to a position of the occupant relative to a focal plane;

detecting changes in the at least two focus attributes of the periodic signals; and determining the position of the occupant relative to the focal plane in response to the changes in the at least two focus attributes of the periodic signals.

13. The method of claim 12 further including the steps of:

receiving the periodic images in first and second filter means;

outputting sharpness signals that are indicative of a sharpness of the received periodic images from the first filter means; and outputting size signals that are indicative of the apparent size of the occupant in the periodic images from the second filter means.

14. The method of claim 13 wherein the step of detecting changes in the focus attributes of the periodic signals includes the step of:

detecting changes in the sharpness and size signals.

15. The method of claim 14 wherein the step of determining the position of the occupant relative to the focal plane further includes the step of:

determining that the occupant is positioned rearward of the focal plane when the detected changes indicate an increase in both the sharpness and apparent size of the occupant.

16. The method of claim 14 wherein the step of determining the position of the occupant relative to the focal plane further includes the step of:

determining that the occupant is positioned rearward of the focal plane when the detected changes indicate a decrease in both the sharpness and apparent size of the occupant.

17. The method of claim 14 wherein the step of determining the position of the occupant relative to the focal plane further includes the step of:

determining that the occupant is positioned rearward of the focal plane when the detected changes indicate one of the sharpness and apparent size of the occupant increasing and another of the sharpness and apparent size of the occupant decreasing.

* * * * *